(12) United States Patent
Seo et al.

(10) Patent No.: US 11,394,446 B2
(45) Date of Patent: Jul. 19, 2022

(54) APPARATUS AND METHOD FOR ESTIMATING INTERFERENCE BASED ON MACHINE LEARNING

(71) Applicant: SAMSUNG ELECTRONICS CO., LTD., Suwon-si (KR)

(72) Inventors: Junyeong Seo, Yeosu-si (KR); Jooyeol Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 110 days.

(21) Appl. No.: 17/060,144

(22) Filed: Oct. 1, 2020

(65) Prior Publication Data
US 2021/0119681 A1 Apr. 22, 2021

Related U.S. Application Data

(60) Provisional application No. 62/923,695, filed on Oct. 21, 2019.

(30) Foreign Application Priority Data

Apr. 7, 2020 (KR) .......................... 10-2020-0042407

(51) Int. Cl.
*H04B 7/06* (2006.01)
*H04B 7/08* (2006.01)
(Continued)

(52) U.S. Cl.
CPC .......... *H04B 7/0634* (2013.01); *G06K 9/6256* (2013.01); *G06N 20/00* (2019.01);
(Continued)

(58) Field of Classification Search
CPC ...... H04B 1/10; H04B 1/1027; H04B 7/0426; H04B 7/0456; H04B 7/063; H04B 7/0634;
(Continued)

(56) References Cited

U.S. PATENT DOCUMENTS

| 7,440,490 B2 | 10/2008 | Kidiyarova-Shevchenk et al. |
| 10,033,482 B2 | 7/2018 | Bae et al. |
| 10,044,490 B2 | 8/2018 | Navalekar |
| 10,368,300 B2 | 7/2019 | Xu et al. |

(Continued)

FOREIGN PATENT DOCUMENTS

| JP | 2019-122039 | 7/2019 |
| KR | 10-2016-0016525 | 2/2016 |

(Continued)

*Primary Examiner* — Young T. Tse
(74) *Attorney, Agent, or Firm* — F. Chau & Associates LLC

(57) ABSTRACT

The present disclosure relates to an interference estimation method and apparatus. The apparatus includes at least one first processor, a serving channel matrix, and an interference channel matrix. The at least one first processor generates an input vector from at least one of a received signal vector corresponding to a received signal with a serving signal and an interference signal. The serving channel matrix corresponds to the serving signal. The interference channel matrix corresponds to the interference signal and a second processor. The second processor executes at least one machine learning model trained by sample input vectors and sample interference parameters. The at least one first processor provides the input vector to the second processor and determines interference parameters corresponding to the interference signal based on an output vector of the at least one machine learning model provided by the second processor.

20 Claims, 13 Drawing Sheets

(51) Int. Cl.
  *G06K 9/62*   (2022.01)
  *G06N 20/00*  (2019.01)
  *H04B 7/0426* (2017.01)

(52) U.S. Cl.
  CPC .......... *H04B 7/0426* (2013.01); *H04B 7/063* (2013.01); *H04B 7/0857* (2013.01)

(58) Field of Classification Search
  CPC .. H04B 7/0639; H04B 7/0857; H04B 17/345; H04L 25/024; H04L 25/0242; G06K 9/6256; G06N 20/00
  USPC ............... 375/144, 148, 260, 262, 265, 267, 375/346–348; 370/208, 210, 332, 333, 370/335, 242
  See application file for complete search history.

(56) References Cited

U.S. PATENT DOCUMENTS

| | | | |
|---|---|---|---|
| 2008/0132281 A1* | 6/2008 | Kim | H04B 17/336 455/562.1 |
| 2012/0202538 A1* | 8/2012 | Uusitalo | H04B 17/3912 455/500 |
| 2019/0122108 A1* | 4/2019 | Kliegl | G06N 5/04 |
| 2019/0122685 A1 | 4/2019 | Defraene et al. | |
| 2021/0051678 A1* | 2/2021 | Suzaki | H04W 24/10 |

FOREIGN PATENT DOCUMENTS

| | | |
|---|---|---|
| KR | 10-2016-0028334 | 3/2016 |
| WO | WO-2021101347 A1 * | 5/2021 |

\* cited by examiner

FIG. 7A

| $r_j$ | $\rho_j$ | $P_i$ | OUT1 |
|---|---|---|---|
| 1 | $\rho_{i,1}$ | $[1,0]^T$ | R1 |
| | | $[1,j]^T$ | R2 |
| | | $[1,0]^T$ | R3 |
| | | $[1,-j]^T$ | R4 |
| | $\rho_{i,2}$ | $[1,0]^T$ | R5 |
| | | $[1,j]^T$ | R6 |
| | | $[1,0]^T$ | R7 |
| | | $[1,-j]^T$ | R8 |
| | $\rho_{i,3}$ | $[1,0]^T$ | R9 |
| | | $[1,j]^T$ | R10 |
| | | $[1,0]^T$ | R11 |
| | | $[1,-j]^T$ | R12 |
| 2 | $\rho_{i,1}$ | N/A | R13 |
| | $\rho_{i,2}$ | | R14 |
| | $\rho_{i,3}$ | | R15 |

FIG. 7B

| $r_1$ | $p_1$ | $P_j$ | OUT2 |
|---|---|---|---|
| 2 | N/A | $\frac{1}{\sqrt{2}}\begin{bmatrix}1 & 0\\ 0 & 1\end{bmatrix}$ | R1' |
| | | $\frac{1}{2}\begin{bmatrix}1 & 1\\ 1 & -1\end{bmatrix}$ | R2' |
| | | $\frac{1}{2}\begin{bmatrix}1 & 1\\ j & -j\end{bmatrix}$ | R3' |

APPARATUS AND METHOD FOR ESTIMATING INTERFERENCE BASED ON MACHINE LEARNING

CROSS-REFERENCE TO RELATED APPLICATIONS

This application claims the benefit of U.S. Provisional Application No. 62/923,695, filed on Oct. 21, 2019, in the US Patent Office and Korean Patent Application No. 10-2020-0042407, filed on Apr. 7, 2020, in the Korean Intellectual Property Office, the disclosures of which are incorporated by reference herein in their entireties.

BACKGROUND

The inventive concept relates to wireless communication, and more particularly, to an apparatus and a method for estimating interference based on machine learning.

A wireless communication system uses electromagnetic signals to transfer information between locations, such as a base station or a mobile device. Mobile devices include mobile phones, tablet computers, and navigation devices. Interference in a wireless communication system affects the system throughput, which is the rate of successful information transfer.

A wireless communication system may use various techniques for increasing throughput. For example, the system may use multiple antennas to transmit and receive signals more efficiently. In some cases, a transmitter transmits a signal with high complexity and a receiver processes the signal.

However, interference may disrupt a receiver from processing a signal received through an antenna. To counter this, interference may be estimated and removed from the signal received by the receiver. In some cases, it is difficult to remove interference from a complex signal. Therefore, there is a need in the art for signal interference estimation.

SUMMARY

The inventive concept relates to an apparatus and a method for efficiently estimating interference based on machine learning.

According to an aspect of the inventive concept, there is provided an apparatus including at least one first processor generating an input vector from at least one of a received signal vector corresponding to a received signal including a serving signal and an interference signal, a serving channel matrix corresponding to the serving signal, and an interference channel matrix corresponding to the interference signal and a second processor executing at least one machine learning model trained by a plurality of sample input vectors and a plurality of sample interference parameters. The at least one first processor provides the input vector to the second processor and determines interference parameters corresponding to the interference signal based on an output vector of the at least one machine learning model provided by the second processor.

According to an aspect of the inventive concept, there is provided a method including generating an input vector from at least one of a received signal vector corresponding to a received signal including a serving signal and an interference signal, a serving channel matrix corresponding to the serving signal, and an interference channel matrix corresponding to the interference signal, providing the input vector to at least one machine learning model trained by a plurality of sample input vectors and a plurality of sample interference parameters, and determining interference parameters corresponding to the interference signal based on an output vector of the at least one machine learning model.

According to an aspect of the inventive concept, there is provided a method including generating a received signal vector from a received signal including a serving signal received through a first channel and an interference signal received through a second channel, generating a serving channel matrix and an interference channel matrix by estimating the first channel and the second channel, and estimating interference parameters corresponding to the received signal vector, the serving channel matrix, and the interference channel matrix based on at least one machine learning model trained by a plurality of sample received signal vectors, a plurality of sample serving channel matrixes, a plurality of sample interference channel matrixes, and a plurality of sample interference parameters.

BRIEF DESCRIPTION OF THE DRAWINGS

Embodiments of the inventive concept will be more clearly understood from the following detailed description taken in conjunction with the accompanying drawings in which:

FIGS. 7A and 7B are tables illustrating examples of output vectors according to exemplary embodiments of the inventive concept;

DETAILED DESCRIPTION OF THE EMBODIMENTS

The present disclosure relates generally to a wireless communication system. More particularly, embodiments of the present disclosure relate to a method and apparatus for estimating the interference in a signal. In some embodiments, signal interference estimation is performed using machine learning.

In some cases, communications at a terminal may be interrupted by an interference signal (e.g., from a neighboring signal). To correct the signal, the terminal may estimate the interference and remove the interference signal from a received signal. However, the complexity of estimating interference signals increases as many combinations of interference signals are evaluated.

Therefore, embodiments of the present disclosure use a trained neural network to estimate interference parameters of a signal. The neural network is trained using inputs and interference parameters. The input provided to the neural network may include real numbers calculated from a received signal, and channel matrices representing a serving channel and an interference channel. The output of the neural network may include ratings for available combinations of the interference parameters and a combination of the interference parameters corresponding to the highest rating may be determined.

Therefore, the interference parameters may be estimated and an increase in complexity for estimating the interference parameters may be limited in spite of increase in the number of complexity of interference parameters. In some examples, outputs of the neural network corresponding to a plurality of radio resources which have common interference parameters may be combined to one output and the interference parameters may be estimated in based on the combined output.

A signal interference method and apparatus of the present disclosure includes at least one first processor, a serving channel matrix, and an interference channel matrix. The at least one first processor generates an input vector from at least one of a received signal vector corresponding to a received signal with a serving signal and an interference signal. The serving channel matrix corresponds to the serving signal. The interference channel matrix corresponds to the interference signal and a second processor. The second processor executes at least one machine learning model trained by sample input vectors and sample interference parameters. The at least one first processor provides the input vector to the second processor and determines interference parameters corresponding to the interference signal based on an output vector of the at least one machine learning model provided by the second processor.

Figure 1:
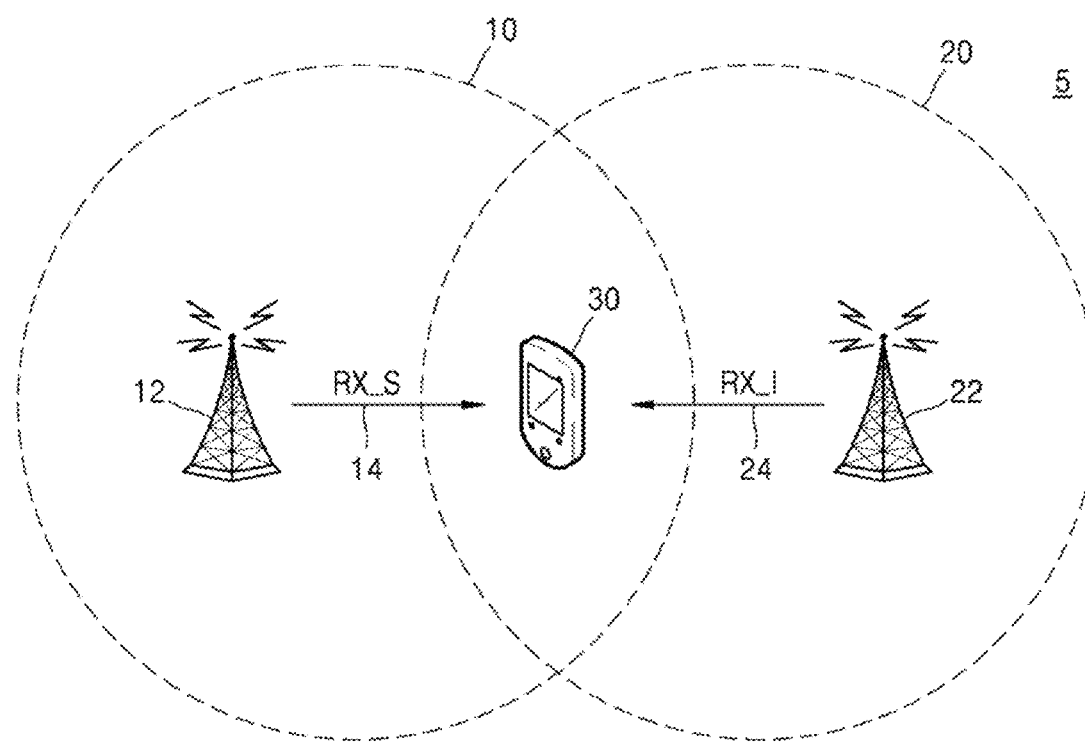
FIG. 1 is a view illustrating a wireless communication system including a user equipment (UE) and a base station according to an exemplary embodiment of the inventive concept.

FIG. 1 is a view illustrating a wireless communication system 5 with a UE and a base station according to an exemplary embodiment of the inventive concept. The wireless communication system 5 may use a cellular network such as a 5th generation wireless (5G) new radio (NR) system, a long term evolution (LTE) system, an LTE-advanced system, a code division multiple access (CDMA) system, or a global system for mobile communications (GSM) system. Hereinafter, the wireless communication system 5 will be described mainly with reference to a wireless communication system 5, in particular, an LTE system as the wireless communication system using a cellular network. However, exemplary embodiments of the inventive concept are not limited thereto.

A base station (BS) 12 or 22 may generally refer to a fixed station communicating with a UE 30 and/or another BS and may exchange data and control information by communicating with the UE 30 and/or another BS. For example, the BS 12 or 22 may be referred to as a node B, an evolved-node B (eNB), a next generation-node B (gNB), a sector, a site, a base transceiver system (BTS), an access point (AP), a relay node, a remote radio head (RRH), a radio unit (RU), or a small cell. Herein, the BS 12 or 22 or cell may be collectively interpreted as representing a partial region or function covered by a base station controller (BSC) in CDMA, a node-B of wideband CDMA (WCDMA), an eNB in LTE, a gNB of 5G, or a sector (the site) and may encompass various coverage regions such as a mega cell, a macro cell, a microcell, a picocell, a femtocell, a relay node, an RRH, an RU, or a small cell communication range.

The UE 30 may refer to any equipment that may be fixed or mobile and may transmit and receive data and/or control information by communicating with the BS 12 or 22. For example, the UE may be referred to as a terminal, terminal equipment, a mobile station (MS), a mobile terminal (MT), a user terminal (UT), a subscriber station (SS), a wireless device, or a handheld device.

A wireless communication network between the UE 30 and the serving or interference BS 12 or 22 may support communication among a plurality of users by sharing available network resources. For example, in the wireless communication network, information may be transmitted by one of various multiple access methods such as CDMA, frequency division multiple access (FDMA), time division multiple access (TDMA), orthogonal frequency division multiple access (OFDMA), single carrier frequency division multiple access (SC-FDMA), OFDM-FDMA, OFDM-TDMA, and OFDM-CDMA.

The UE 30 may receive a serving signal RX_S (e.g., the intended signal to be received) and an interference signal RX_I (e.g., an unintended interference signal). For example, as illustrated in FIG. 1, a first channel 14 may be formed between the UE 30 and the serving BS 12 of a serving cell 10. The UE 30 may receive the serving signal RX_S from the BS 12 through the first channel 14. Additionally or alternatively, a second channel 24 may be formed between the UE 30 and the interference BS 22 of a neighboring cell 20. The UE 30 may receive the interference signal RX_I through the second channel 24. In some embodiments, the UE 30 may receive an interference signal from another interference source such as a relay, a repeater, or interference BS 22 illustrated in FIG. 1 and may receive interference signals from a plurality of interference sources. Therefore, a signal (referred to as a received signal herein) received by the UE 30 through the antenna may include the serving signal RX_S and the interference signal RX_I and the UE 30 may be used to correctly detect and remove the interference signal RX_I to detect the serving signal RX_S provided by the serving BS 12 from the received signal. For example, a signal received by the UE 30 from an arbitrary radio resource may be represented as follows in Equation 1.

$$y = y_S + y_I + n \qquad \text{Equation 1}$$

In Equation 1, a vector y (referred to as a received signal vector herein) may correspond to the received signal, a vector $y_S$ may correspond to the serving signal RX_S, a vector $y_I$ may correspond to the interference signal RX_I, and a vector n may correspond to noise. Therefore, the vector $y_S$ corresponding to the received signal may be obtained by removing the vectors $y_1$ and n from the vector y.

To remove the interference signal RX_I from the received signal, for example, to obtain the vector $y_I$ from Equation 1, the UE 30 may estimate interference parameters. For example, the 3rd generation partnership project (3GPP) LTE may regulate network assisted interference cancellation and suppression (NAICS), and the UE 30 may estimate interference parameters in accordance with the NAICS. The interference parameters defining the interference signal RX_I may include transmission parameters used by the interference BS 22 transmitting the interference signal RX_I and may fluctuate in accordance with various causes. For example, the interference parameters may include interference parameters provided by a radio resource control (RRC) layer and fluctuate slowly such as a physical cell ID, a cell-specific signal (CSS) port number, a transmission mode, a multicast-broadcast single frequency network (MBSFN) configuration, a resource block granularity, a cell-specific traffic-to-pilot power ratio (TPR), and limited candidate values of a UE-specific TPR. The interference parameters may also include interference parameters that fluctuate rapidly in units of resource blocks such as a UE-specific TPR, a rank indicator (RI), and a precoding matrix index (PMI). Therefore, the UE 30 may be used to correctly and efficiently estimate the interference parameters that fluctuate rapidly from the received signal.

In some embodiments, the UE 30 may report information on interference, for example, the estimated interference parameters to the serving BS 12 and the serving BS 12 may increase communication performance based on the estimated interference. For example, the serving BS 12 may control contention and scheduling based on the information provided by the UE 30. In some embodiments, the serving BS 12 may reduce a rank of the MIMO for the UE 30 in a state in which the effect of interference is high like the UE 30 positioned at a cell edge illustrated in FIG. 1. Hereinafter, exemplary embodiments of the inventive concept will be described with reference to a case in which a rank of a transmission signal transmitted by the serving BS 12 is 1. However, the inventive concept is not limited thereto.

Estimation of the interference parameters based on maximum likelihood may use an exhaustive search for the combinations of the interference parameters and, accordingly, may have complexity remarkably increasing as the interference parameters to be estimated by the UE 30 increase. Additionally or alternatively, the estimation of the interference parameters based on the maximum likelihood may use an actual probability distribution of an environment in which interference occurs or a probability distribution approximate to the actual probability distribution. Therefore, by using a probability model obtained by modeling the probability distribution, the accuracy of the estimation may be limited.

As described later with reference to the drawings, the UE 30 may estimate the interference parameters based on machine learning. Therefore, an exhaustive search for estimating the interference parameters may be omitted, and, in spite of the increase in the interference parameters, interference may be efficiently estimated. Additionally or alternatively, by using a machine learning model learned by sample data obtained by an actual communication environment, the probability distribution is not required, and the accuracy of the estimation of the interference parameters may increase. Additionally or alternatively, due to reduced complexity, the rapidly fluctuating interference parameters may be efficiently estimated, and accordingly, the reception performance of the UE 30 and the efficiency of the wireless communication system 5 may increase.

Figure 2:
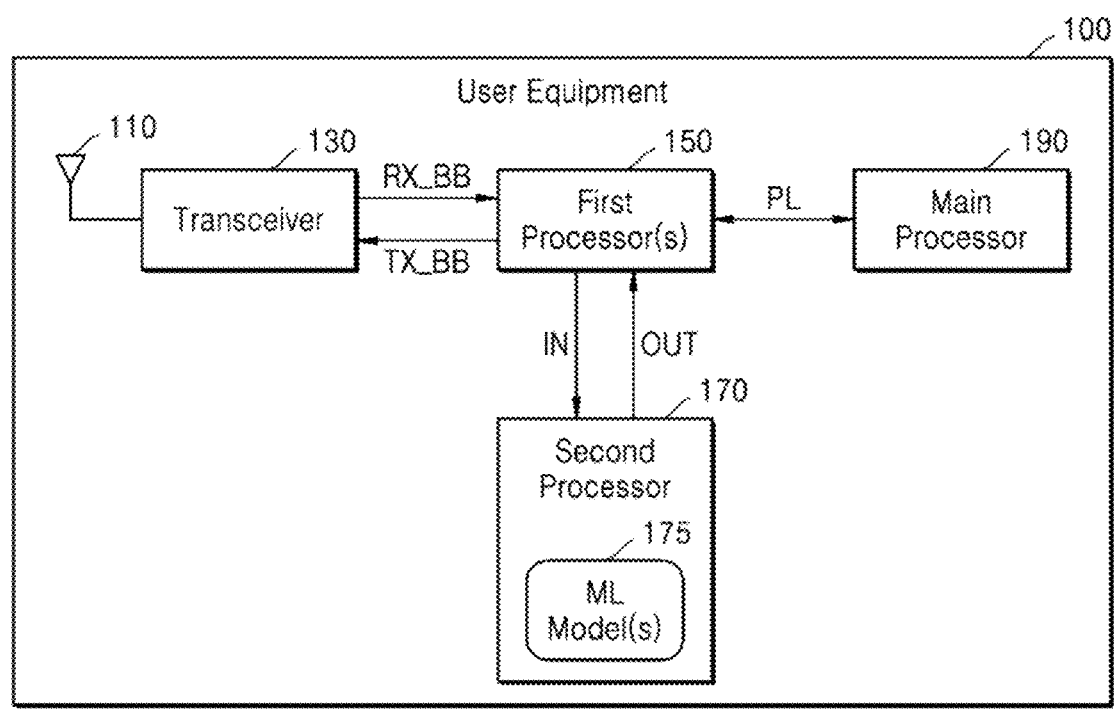
FIG. 2 is a block diagram illustrating a UE according to an exemplary embodiment of the inventive concept.

FIG. 2 is a block diagram illustrating a UE 100 according to an exemplary embodiment of the inventive concept. As described above with reference to FIG. 1, the UE 100 may receive the received signal with the serving signal RX_S and the interference signal RX_I and may remove the interference signal RX_I from the received signal by estimating the interference parameters. As illustrated in FIG. 2, the UE 100 may include an antenna 110, a transceiver 130, at least one first processor 150, a second processor 170, and a main processor 190. Two or more components of the UE 100 may be implemented as one entity (for example, a semiconductor chip) irrespectively of FIG. 2. Hereinafter, FIG. 2 will be described with reference to FIG. 1.

The antenna 110 may receive a radio frequency (RF) signal from the outside of the UE 100 or may output the RF signal to the outside of the UE 100. In some embodiments, the antenna 110 may contain an antenna array including a plurality of antennas and may support MIMO and/or beam forming.

The transceiver 130 may process a signal between the antenna 110 and the at least one first processor 150. For example, the transceiver 130 may include a duplexer, a switch, a filter, a mixer, and an amplifier. The transceiver 130 may generate a baseband reception signal RX_BB by processing the RF signal received from the antenna 110 and may provide the baseband reception signal RX_BB to the at least one first processor 150.

A baseband signal may refer to a signal in a frequency band in which the signal is generated. In some cases, a communication device may generate signals at one frequency (e.g., a relatively low frequency) and then transmit and receive signals at another frequency (e.g., a relatively high frequency). The frequency at which the signal is generated (or processed by the receiver) is sometimes known as the baseband frequency, while the transmission frequency (or reception frequency) is known as the radio frequency. The signals at one frequency (e.g., the transmission frequency) may be converted to another frequency (e.g., the baseband frequency) by combining the received frequency with another signal and filtering the result.

The transceiver 130 may generate the RF signal by processing a baseband transmission signal TX_BB provided by the at least one first processor 150 and may provide the RF signal to the antenna 110. In some embodiments, the transceiver 130 may be referred to as a radio frequency integrated circuit (RFIC).

The at least one first processor 150 may perform an operation corresponding to at least one layer in a wireless protocol structure defined by the wireless communication system 5. For example, the at least one first processor 150 may include two or more processors processing each of the layers in the wireless protocol structure. As illustrated in FIG. 2, the at least one first processor 150 may generate the baseband transmission signal TX_BB by processing a payload PL provided by the main processor 190 and may generate the payload PL by processing the baseband reception signal RX_BB received from the transceiver 130.

The at least one first processor 150 may also provide the baseband transmission signal TX_BB and the payload PL to the main processor 190. In some embodiments, the at least one first processor 150 may include hardware including a logic block designed through logical synthesis, a processing unit including software and at least one core for executing the software, and a combination of the hardware and the processing unit. In some embodiments, the at least one first processor 150 may be referred to as a communication processor, a modem, or the like. The at least one first processor 150 and the second processor 170 to be described later may be collectively referred to as the communication processor or the modem.

The at least one first processor 150 may generate an input vector IN to estimate the interference parameters and may provide the input vector IN to the second processor 170. In some examples, an input vector is a set of real or complex numbers where each number is associated with an index. The input vector may correspond to measured parameters of a signal or channel. Additionally, the input vector may correspond to received information about an interfering signal, or information about a channel.

Additionally or alternatively, the at least one first processor 150 may receive an output vector OUT from the second processor 170 and may estimate the interference parameters based on the output vector OUT. An output vector may also be a set of numbers where each number is associated with an index (e.g., an index corresponding to a dimension of the vector). Specifically, the output vector is a set of numbers output by a function (which may be represented by a machine learning model). An example of an operation of the at least one first processor 150 for estimating the interference parameters will be described with reference to FIG. 3.

The second processor 170 may execute at least one machine learning model 175. The at least one machine learning model 175 may be in a state trained by a plurality of sample input vectors and a plurality of sample interference parameters (e.g., corresponding to a rank, transmission power, and/or a precoding matrix of an interfering signal). Therefore, the second processor 170 may provide the output vector OUT generated by the at least one machine learning model 175 to the at least one first processor 150 in response to the input vector IN provided by the at least one first processor 150.

For example, the sample input vectors and the sample interference parameters may correspond to labeled training data for a supervised learning. Supervised learning is one of three basic machine learning paradigms, alongside unsupervised learning and reinforcement learning. Supervised learning is a machine learning task based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. in other words, the learning algorithm generalizes from the training data to unseen examples.

The at least one machine learning model 175 may be an arbitrary model trained by the plurality of sample input vectors and the plurality of sample interference parameters. For example, the at least one machine learning model 175 may be based on an artificial neural network, a decision tree, a support vector machine, a regression analysis, a Bayesian network, and a genetic algorithm. Hereinafter, the at least one machine learning model 175 will be described mainly with reference to the artificial neural network (ANN). However, exemplary embodiments of the inventive concept are not limited thereto.

An ANN is a hardware or a software component that includes a number of connected nodes (i.e., artificial neurons), which loosely corresponds to the neurons in a human brain. Each connection, or edge, transmits a signal from one node to another (like the physical synapses in a brain). When a node receives a signal, it processes the signal and then transmit the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

As a non-limiting example, the artificial neural network may be a convolution neural network (CNN), a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, or a classification network.

An S-DNN refers to a neural network aggregated with multiple basic learning modules, one after another, to synthesize a deep neural network (DNN). Unlike a some DNNs trained end-to-end using backpropagation, S-DNN layers may be trained independently without backpropagation.

An S-SDNN extends a dynamic neural network (DNN) to include a robust state-space formulation. In some cases, a training algorithm exploiting an adjoint sensitivity computation is utilized to enable an SSDNN to efficiently learn from transient input and output data without relying on the circuit internal details.

A DBN is a generative graphical model (or a class of deep neural network), composed of multiple layers of latent variables with connections between the layers but not between units within each layer. When initially trained on a set of examples without supervision, a DBN can learn to probabilistically reconstruct its inputs. The layers can act as feature detectors. After initial training, a DBN can be further trained with supervision to perform classification.

A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In some cases, a standard CNN may not be suitable when the length of the output layer is variable, i.e., when the number of the objects of interest is not fixed. Selecting a large number of regions to analyze using conventional CNN techniques may result in computational inefficiencies. Thus, in the R-CNN approach, a finite number of proposed regions are selected and analyzed.

A deconvolution layer refers to a neural network layer that performs a convolution while attempting to decorrelate channel-wise and spatial correlation. For example, in some cases a deconvolution layer may include white space, or padding to input data.

An RNN is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). The term RNN may include finite impulse recurrent networks (characterized by nodes forming a directed acyclic graph), and infinite impulse recurrent networks (characterized by nodes forming a directed cyclic graph).

An LSTM is a form of RNN that includes feedback connections. In one example, and LSTM includes a cell, an input gate, an output gate and a forget gate. The cell stores values for a certain amount of time, and the gates dictate the flow of information into and out of the cell. LSTM networks may be used for making predictions based on series data where there can be gaps of unknown size between related information in the series. LSTMs can help mitigate the vanishing gradient (and exploding gradient) problems when training an RNN.

An RBM is a generative stochastic artificial neural network that can learn a probability distribution over its set of inputs. Specifically, an RBM is a Boltzmann machine with the restriction that neurons must form a bipartite graph (i.e., a pair of nodes from each of the two groups of units that have a symmetric connection between them); and there are no connections between nodes within a group. By contrast, "unrestricted" Boltzmann machines may have connections between hidden units. The restriction in an RBM allows for more efficient training algorithms than are available for the general class of Boltzmann machines such as a gradient-based contrastive divergence algorithm.

In some embodiments, the second processor 170 may be hardware (for example, 250 of FIG. 12) designed for executing the at least one machine learning model 175 and may include memory for storing data used for executing the at least one machine learning model 175. Additionally or alternatively, in some embodiments, operations of the at least one first processor 150 and the second processor 170 may be performed by a single processor included in the UE 100.

The main processor 190 may include at least one core and may provide the payload PL with information to be transmitted through wireless communication to the at least one first processor 150. The main processor 190 may also obtain the information transmitted by a base station through the payload PL provided by the at least one first processor 150. The main processor 190 may generate the payload PL by performing various operations and may perform various operations based on the received payload PL. In some embodiments, the main processor 190 may control an operation of the UE 100 and may process a user input to the UE 100.

Therefore, according to an embodiment of the present disclosure, the first processor(s) 150 may generate an input vector IN (e.g., by processing the baseband reception signal RX_BB) and send the input vector IN to the second processor 170, which includes one or more machine learning models (e.g., one or more ANN). The second processor may then generate the output vector OUT, which estimates interference parameters such as the rank, transmission power, or precoding matrix or a neighboring interference signal. the output vector OUT may then be used to further process the received signal, or to process a subsequent outbound signal for transmission.

Figure 3:
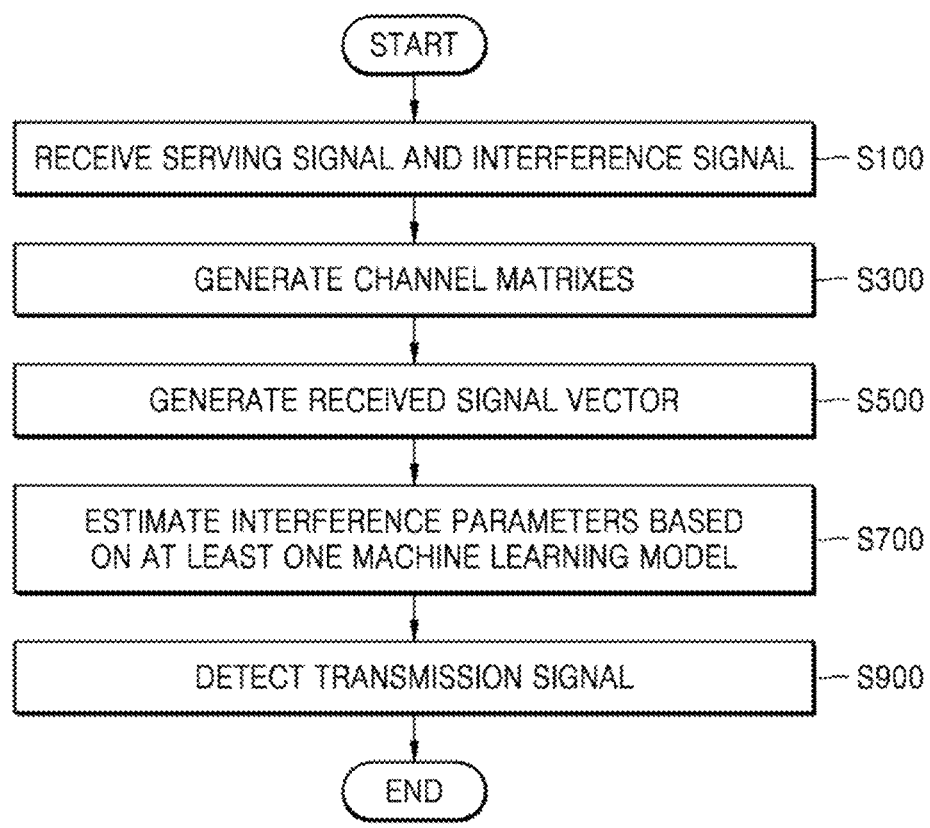
FIG. 3 is a flowchart illustrating an example of a method of estimating interference, according to an exemplary embodiment of the inventive concept.

FIG. 3 is a flowchart illustrating an example of a method of estimating interference, according to an exemplary embodiment of the inventive concept. As illustrated in FIG. 3, the method of estimating interference may include a plurality of operations S100, S300, S500, S700, and S900. In some embodiments, the method of FIG. 3 may be performed by the UE 100 of FIG. 2. Hereinafter, FIG. 3 will be described with reference to FIGS. 1 and 2 and the UE 30 of FIG. 1 is assumed to be the UE 100 of FIG. 2.

Referring to FIG. 3, in operation S100, an operation of receiving the serving signal RX_S and the interference signal RX_I may be performed. For example, the UE 100 may receive the serving signal RX_S from the serving BS 12 and may receive the interference signal RX_I from the interference BS 22 through the antenna 110.

In operation S300, an operation of generating channel matrixes may be performed. The channel matrix may represent a channel through which a signal transmitted to the UE 100 may pass. For example, the at least one first processor 150 may estimate the first channel 14 based on a reference signal provided by the serving BS 12, for example, a cell-specific reference signal (CRS) and may generate a serving channel matrix representing the first channel 14. Additionally or alternatively, the at least one first processor 150 may estimate the second channel 24 based on a reference signal provided by the interference BS 22 of the neighboring cell 20, for example, the CRS and may generate an interference channel matrix representing the second channel 24.

In operation S500, an operation of generating a received signal vector may be performed. For example, the at least one first processor 150 may generate a received signal vector $y^{(k)}$ corresponding to a kth radio resource (for example, RB or RE of FIG. 9) based on the baseband received signal RX_BB provided by the transceiver 130 and the received signal vector $y^{(k)}$ may be represented as follows in Equation 2 (k is an integer greater than 0) when a rank of the transmission signal transmitted by the serving BS 12 is 1.

$$y = h_S^{(k)} x_S^{(k)} + \rho_I H_I^{(k)} P_I x_I^{(k)} + n^{(k)} \qquad \text{Equation 2}$$

In Equation 2, $h_S^{(k)}$ corresponds to the serving channel matrix representing the first channel 14 through which the serving signal RX_S is received, a vector $x_S^{(k)}$ may correspond to the transmission signal transmitted by the serving BS 12, $\rho_I$ may correspond to the TPR (referred to as an interference TPR herein) used for transmitting the interference signal RX_I, $H_I^{(k)}$ may correspond to the interference channel matrix representing the second channel 24 through which the interference signal RX_I is received, $P_I$ may correspond to the precoding matrix (referred to as an interference precoding matrix herein) used for transmitting the interference signal RX_I, a vector $x_I^{(k)}$ may correspond to the transmission signal transmitted by the interference BS 22, and a vector $n^{(k)}$ may correspond to noise.

In operation S300, because the serving channel matrix $h_S^{(k)}$ and the interference channel matrix $H_I^{(k)}$ are generated, the UE 30 may estimate the interference TPR $\rho_I$ and the interference precoding matrix $P_I$ as the interference parameters and a rank $r_I$ (referred to as an interference rank herein) of the transmission signal transmitted by the interference BS 22. Herein, the interference rank $r_I$, the interference TPR $\rho_I$, and the interference precoding matrix $P_I$ may be respectively referred to as a first interference parameter, a second interference parameter, and a third interference parameter.

In operation S700, an operation of estimating the interference parameters based on the at least one machine learning model 175 may be performed. For example, the at least one first processor 150 may provide the input vector IN generated based on at least one of the received signal vector $y^{(k)}$ and the serving channel matrix $h_S^{(k)}$ and the interference channel matrix $H_I^{(k)}$ to the second processor 170 and may determine the interference rank $r_I$, the interference TPR $\rho_I$, and the interference precoding matrix $P_I$ based on the output vector OUT provided by the second processor 170. An example of operation S700 will be described with reference to FIGS. 4 and 10.

In operation S900, an operation of detecting the transmission signal may be performed. For example, the at least one first processor 150 may generate the vector $x_S^{(k)}$ from the received signal vector $y^{(k)}$, the serving channel matrix $h_S^{(k)}$ and the interference channel matrix $H_I^{(k)}$ generated in operation S100, and the interference parameter estimated in operation S700 and may generate the payload PL by demodulating and/or decoding the vector $x_S^{(k)}$.

Figure 4:
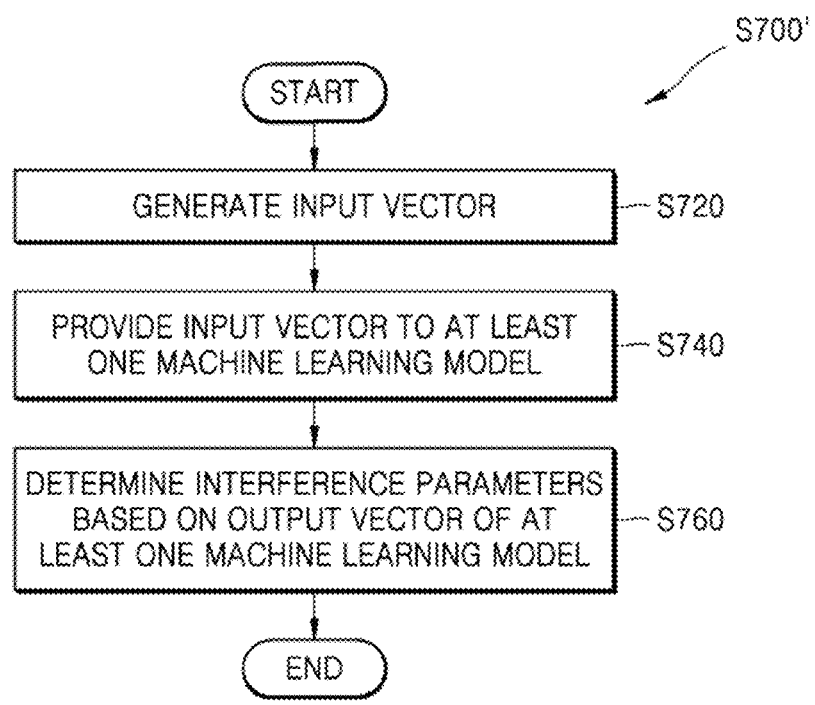
FIG. 4 is a flowchart illustrating an example of a method of estimating interference, according to an exemplary embodiment of the inventive concept.

FIG. 4 is a flowchart illustrating an example of a method of estimating interference, according to an exemplary embodiment of the inventive concept, showing the example of operation S700 of FIG. 3. As described above with reference to FIG. 3, in operation S700' of FIG. 4, an operation of estimating the interference parameters based on at least one machine learning model may be performed. As illustrated in FIG. 4, operation S700' may include a plurality of operations S720, S740, and S760. Hereinafter, FIG. 4 will be described with reference to FIGS. 2 and 3.

Referring to FIG. 4, in operation S720, an operation of generating the input vector IN may be performed. For example, the at least one first processor 150 may generate the input vector IN based on at least one of the received signal vector $y^{(k)}$, the serving channel matrix $h_S^{(k)}$, and the interference channel matrix $H_I^{(k)}$. As described above with reference to FIG. 2, the at least one first processor 150 may generate the input vector IN which has a format to be input to the at least one machine learning model 175, for example, a format to be recognized by the at least one machine learning model 175 so that the input vector IN may be provided to the at least one machine learning model 175. The input vector IN may have the same form as the plurality of sample input vectors used while the at least one machine learning model 175 is trained, for example, offline. An example of operation S720 will be described with reference to FIG. 5.

In operation S740, an operation of providing the input vector IN to the at least one machine learning model 175 may be performed. For example, the at least one first processor 150 may provide the input vector IN generated in operation S720 to the second processor 170 and the second processor 170 may provide the output vector OUT generated by the at least one machine learning model 175 to the at least one first processor 150 in response to the input vector IN by executing the at least one machine learning model 175.

In operation S760, an operation of determining the interference parameters based on the output vector OUT of the at least one machine learning model 175 may be performed. In some embodiments, the at least one machine learning model 175 may generate the output vector OUT with ratings respectively corresponding to available combinations of the interference parameters. For example, when the interference BS 22 uses two antennas for transmission, in accordance with a 3GPP LTE system, the interference rank $r_I$ may have a value of 1 or 2 ($r_I \in \{1,2\}$) and the interference TPR $\rho_I$ may have one of three candidate values $\rho_{I,1}$, $\rho_{I,2}$, and $\rho_{I,3}$ provided by the RRC layer ($\rho_I \in \{\rho_{I,1}, \rho_{I,2}, \rho_{I,3}\}$). Additionally or alternatively, an available value of the interference precoding matrix $P_I$ may be represented as follows in Equation 3.

$$P_I = \begin{cases} \left\{\left[1, \exp\left(j\frac{n\pi}{2}\right)\right]^T, n = 0, 1, 2, 3\right\} & \text{if } r_I = 1 \\ \left\{\frac{1}{\sqrt{2}}\begin{bmatrix}1 & 0\\ 0 & 1\end{bmatrix}, \frac{1}{2}\begin{bmatrix}1 & 1\\ 1 & -1\end{bmatrix}, \frac{1}{2}\begin{bmatrix}1 & 1\\ j & -j\end{bmatrix}\right\} & \text{if } r_I = 2 \end{cases} \quad \text{Equation 3}$$

Therefore, finite combinations of the available values of the interference rank $r_I$, the interference TPR $\rho_I$ and the interference precoding matrix $P_I$ may be provided and the at least one machine learning model 175 may generate the output vector OUT, including ratings respectively corresponding to the finite combinations. The at least one first processor 150 may identify a combination corresponding to the highest rating based on the output vector OUT and may determine the interference parameters as values corresponding to the identified combination. An example of operation S760 will be described with reference to FIGS. 8 and 10.

Figure 5:
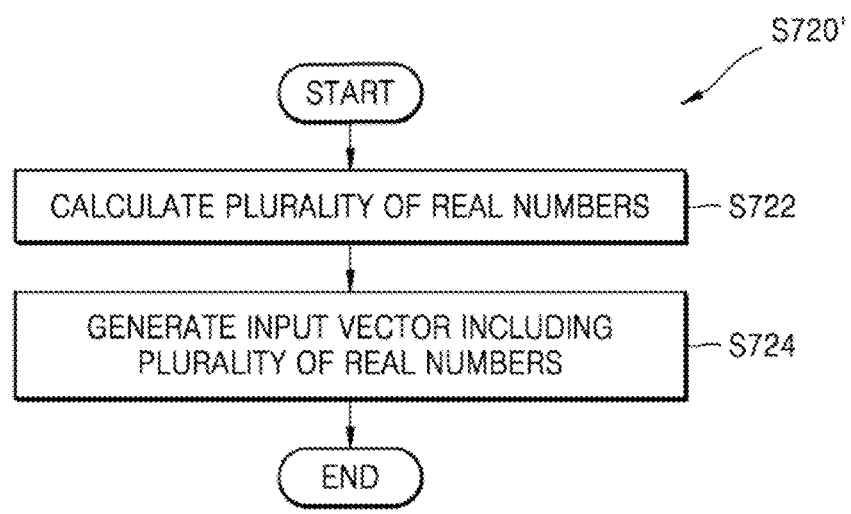
FIG. 5 is a flowchart illustrating an example of a method of estimating interference, according to an exemplary embodiment of the inventive concept.

FIG. 5 is a flowchart illustrating an example of a method of estimating interference, according to an exemplary embodiment of the inventive concept, showing the example of operation S720 of FIG. 4. As described above with reference to FIG. 4, in operation S720' of FIG. 5, an operation of generating the input vector IN may be performed. As illustrated in FIG. 5, operation S720' may include operations S722 and S724. In some embodiments, operation S720' of FIG. 5 may be performed by the at least one first processor 150 of FIG. 2 and FIG. 5 will be described with reference to FIG. 2.

Referring to FIG. 5, an operation of calculating a plurality of real numbers may be performed in operation S722. An operation of generating the input vector IN, with the plurality of real numbers, may be performed in operation S724. For example, the at least one first processor 150 may calculate the plurality of real numbers based on at least one of the received signal vector $y^{(k)}$, the serving channel matrix $h_S^{(k)}$, and the interference channel matrix $H_I^{(k)}$ and may generate the input vector IN, with the plurality of calculated real numbers.

In some embodiments, the at least one first processor 150 may generate the input vector IN including the plurality of calculated real numbers from the received signal vector $y^{(k)}$, the serving channel matrix $h_S^{(k)}$, and the interference channel matrix $H_I^{(k)}$. For example, the at least one first processor 150 may generate the input vector IN including 16 real numbers as represented in Equation 4.

$$IN = \begin{cases} \|y^{(k)}\|^2, \|h_S^{(k)}\|^2, \|h_{I,1}^{(k)}\|^2, \|h_{I,2}^{(k)}\|^2, \\ \operatorname{Re}(h_S^{(k)H} y^{(k)}), \operatorname{Im}(h_S^{(k)H} y^{(k)}), \\ \operatorname{Re}(h_{I,1}^{(k)H} y^{(k)}), \operatorname{Im}(h_{I,1}^{(k)H} y^{(k)}), \\ \operatorname{Re}(h_{I,2}^{(k)H} y^{(k)}), \operatorname{Im}(h_{I,2}^{(k)H} y^{(k)}), \\ \operatorname{Re}(h_S^{(k)H} h_{I,1}^{(k)}), \operatorname{Im}(h_S^{(k)H} h_{I,1}^{(k)}), \\ \operatorname{Re}(h_S^{(k)H} h_{I,2}^{(k)}), \operatorname{Im}(h_S^{(k)H} h_{I,2}^{(k)}), \\ \operatorname{Re}(h_{I,1}^{(k)H} h_{I,2}^{(k)}), \operatorname{Im}(h_{I,1}^{(k)H} h_{I,2}^{(k)}) \end{cases} \quad \text{Equation 4}$$

In Equation 4, $h_{I,1}^{(k)}$ and $h_{I,2}^{(k)}$ may respectively correspond to a first layer and a second layer in the interference channel matrix $H_I^{(k)}$ with a rank 2.

In some embodiments, the at least one first processor 150 may generate the input vector IN including the plurality of calculated real numbers from the received signal vector $y^{(k)}$ and the interference channel matrix $H_I^{(k)}$. For example, the at least one first processor 150 may generate the input vector IN including 5 real numbers as represented in Equation 5.

$$IN = \left\{ \begin{array}{c} \dfrac{\left|\left(h_{I,1}^{(k)}+h_{I,2}^{(k)}\right)^H y^{(k)}\right|^2}{\left\|h_{I,1}^{(k)}+h_{I,2}^{(k)}\right\|^2}, \dfrac{\left|\left(h_{I,1}^{(k)}-h_{I,2}^{(k)}\right)^H y^{(k)}\right|^2}{\left\|h_{I,1}^{(k)}-h_{I,2}^{(k)}\right\|^2}, \\[6pt] \dfrac{\left|\left(h_{I,1}^{(k)}+jh_{I,2}^{(k)}\right)^H y^{(k)}\right|^2}{\left\|h_{I,1}^{(k)}+jh_{I,2}^{(k)}\right\|^2}, \dfrac{\left|\left(h_{I,1}^{(k)}-jh_{I,2}^{(k)}\right)^H y^{(k)}\right|^2}{\left\|h_{I,1}^{(k)}-jh_{I,2}^{(k)}\right\|^2}, \\[6pt] \dfrac{\left\|\left(H_I^{(k)}\right)^H y^{(k)}\right\|^2}{\left\|H_I^{(k)}\right\|_F^2} \end{array} \right\} \quad \text{Equation 5}$$

In some embodiments, the at least one first processor 150 may generate the input vector IN including the plurality of real numbers from the received signal vector $y^{(k)}$, the interference channel matrix $H_I^{(k)}$, and the noise. For example, the at least one first processor 150 may generate the input vector IN including 6 real numbers as represented in Equation 6.

$$IN = \left\{ \begin{array}{c} \dfrac{\tfrac{1}{2}\dfrac{\left|\left(h_{I,1}^{(k)}+h_{I,2}^{(k)}\right)^H y^{(k)}\right|^2}{\sigma^4}}{1+\tfrac{1}{2}\dfrac{\left\|h_{I,1}^{(k)}+h_{I,2}^{(k)}\right\|^2}{\sigma^2}}, \dfrac{\tfrac{1}{2}\dfrac{\left|\left(h_{I,1}^{(k)}-h_{I,2}^{(k)}\right)^H y^{(k)}\right|^2}{\sigma^4}}{1+\tfrac{1}{2}\dfrac{\left\|h_{I,1}^{(k)}-h_{I,2}^{(k)}\right\|^2}{\sigma^2}}, \\[10pt] \dfrac{\tfrac{1}{2}\dfrac{\left|\left(h_{I,1}^{(k)}+jh_{I,2}^{(k)}\right)^H y^{(k)}\right|^2}{\sigma^4}}{1+\tfrac{1}{2}\dfrac{\left\|h_{I,1}^{(k)}+jh_{I,2}^{(k)}\right\|^2}{\sigma^2}}, \dfrac{\tfrac{1}{2}\dfrac{\left|\left(h_{I,1}^{(k)}-jh_{I,2}^{(k)}\right)^H y^{(k)}\right|^2}{\sigma^4}}{1+\tfrac{1}{2}\dfrac{\left\|h_{I,1}^{(k)}-jh_{I,2}^{(k)}\right\|^2}{\sigma^2}}, \\[10pt] \dfrac{\tfrac{1}{2}\dfrac{\left|\left(h_{I,1}^{(k)}\right)^H y^{(k)}\right|^2}{\sigma^4}}{1+\tfrac{1}{2}\dfrac{\left\|h_{I,1}^{(k)}\right\|^2}{\sigma^2}}, \dfrac{\tfrac{1}{2}\dfrac{\left|\left(h_{I,2}^{(k)}\right)^H y^{(k)}\right|^2}{\sigma^4}}{1+\tfrac{1}{2}\dfrac{\left\|h_{I,2}^{(k)}\right\|^2}{\sigma^2}} \end{array} \right\} \quad \text{Equation 6}$$

In Equation 6, σ may represent a standard deviation of the noise included in the received signal. Equation 4, Equation 5, and Equation 6 are examples of the input vector IN and the at least one first processor 150 may generate the input vector IN different from that in the above-described examples.

Figure 6:
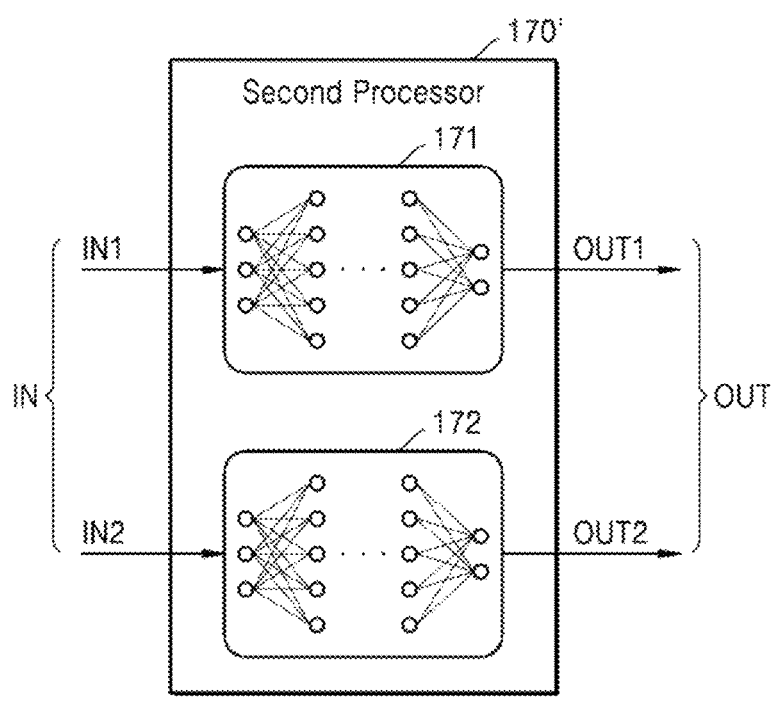
FIG. 6 is a block diagram illustrating an example of a second processor according to an exemplary embodiment of the inventive concept.

FIG. 6 is a block diagram illustrating an example of a second processor 170' according to an exemplary embodiment of the inventive concept. The second processor 170' of FIG. 6 may execute at least one machine learning model as described above with reference to FIG. 2 and may execute a first machine learning model 171 and a second machine learning model 172 as illustrated in FIG. 6.

Referring to FIG. 6, the input vector IN may include a first input vector IN1 and a second input vector IN2 and the output vector OUT may include a first output vector OUT1 and a second output vector OUT2. As illustrated in FIG. 6, the first machine learning model 171 may generate the first output vector OUT1 in response to the first input vector IN1 and the second machine learning model 172 may generate the second output vector OUT2 in response to the second input vector IN2. In some embodiments, the second processor 170' may execute three or more machine learning models.

In some embodiments, each of the first machine learning model 171 and the second machine learning model 172 may be a fully-connected (FC) neural network. A fully connected neural network includes a series of fully connected layers. A fully connected layer is a function in which each output dimension depends on each input dimension.

In some embodiments, the second processor 170' may execute two or more identical machine learning models in parallel. For example, the first machine learning model 171 and the second machine learning model 172 may have the same structure and may be trained in the same way and may be trained by identical sample input vectors and sample output vectors. As described later with reference to FIGS. 9, 10, and 11, in some embodiments, a series of input vectors corresponding to a series of radio resources may be generated to estimate the interference parameters and a series of output vectors corresponding to the series of input vectors may be collected. As a result, the second processor 170' may accelerate the generation of the series of output vectors by executing two or more identical machine learning models in parallel. For example, the first input vector IN1 and the second input vector IN2 may correspond to each of radio resources close to a time domain or a frequency domain.

In some embodiments, the second processor 170' may execute two or more different machine learning models. For example, the first machine learning model 171 and the second machine learning model 172 may have different structures and/or may be differently trained, for example, may be trained by different sample input vectors and/or different sample output vectors. In some embodiments, the interference parameters may include interference parameters determined by different machine learning models. For example, interference parameters determined by the first machine learning model 171 may be different from interference parameters determined by the second machine learning model 172. Additionally or alternatively, in some embodiments, the machine learning models may be hierarchically executed. For example, the second machine learning model 172 may be selectively executed in accordance with the first output vector OUT1 of the first machine learning model 171.

Examples in which the first machine learning model 171 and the second machine learning model 172 are hierarchically executed will be described with reference to FIGS. 7A, 7B, and 8.

FIGS. 7A and 7B are tables illustrating examples of output vectors according to exemplary embodiments of the inventive concept. The table of FIG. 7A illustrates an example of the first output vector OUT1 of FIG. 6 and the table of FIG. 7B illustrates an example of the second output vector OUT2 of FIG. 6. As described above with reference to FIG. 4, the output vector may include the ratings respectively corresponding to the available combinations of the values of the interference parameters. In the examples of FIGS. 7A and 7B, the first output vector OUT1 and the second output vector OUT2 may include the ratings respectively corresponding to the available combinations of the values of the interference rank $r_I$, the interference TPR $\rho_I$, and the interference precoding matrix $P_I$. Hereinafter, the first machine learning model 171 of FIG. 6 is assumed to generate the first output vector OUT1 of FIG. 7A and the second machine learning model 172 of FIG. 6 generates the second output vector OUT2 of FIG. 7B and FIGS. 7A and 7B will be described with reference to FIG. 6.

Referring to FIG. 7A, the first output vector OUT1 may include ratings respectively corresponding to available combinations of the values including the interference rank $r_I$ equal to 1 and combinations of values of the interference rank $r_I$ equal to 2 and the interference TPR $\rho_I$. For example, as described above with reference to FIG. 4, the interference rank $r_I$ may have the value of 1 or 2 ($r_I \in \{1,2\}$) and the interference TPR p, may have one of the three candidate values $\rho_I$, $\rho_{I,2}$, and $P_{I,3}$ provided by the RRC layer ($\rho_I \in \{\rho_{I,1}, \rho_{I,2}, \rho_{I,3}\}$), and at the same time, the interference precoding matrix $P_I$ may be dependent on the value of the interference rank $r_I$ as illustrated in Equation 3. The first output vector OUT1 may include first to 12th ratings R1 to R12 respectively corresponding to 12 combinations including the interference rank $r_I$ equal to 1 and 13th to 15th ratings R13 to R15 respectively corresponding to three combinations of the values of the interference rank $r_I$ equal to 2 and the interference TPR $\rho_I$. The first machine learning model 171 may be trained so that a rating corresponding to a selected combination among the 15 combinations of FIG. 7A has the largest value (or the smallest value).

Referring to FIG. 7B, the second output vector OUT2 may include ratings respectively corresponding to combinations of values of the interference rank $r_I$ equal to 2 and the interference precoding matrix $P_I$. For example, the second machine learning model 172 may include first to third ratings R1' to R3' respectively corresponding to three combinations of the values of the interference rank $r_I$ equal to 2 and the interference precoding matrix $P_I$. The second machine learning model 172 may be trained so that a rating corresponding to a selected combination among the three combinations of FIG. 7B has the largest value (or the smallest value). An example of operation of determining the interference parameters, for example, the interference rank $r_I$, the interference TPR $\rho_I$, and the interference precoding matrix $P_I$ based on the first machine learning model 171 generating the first output vector OUT1 of FIG. 7A and the second machine learning model 172 generating the second output vector OUT2 of FIG. 7B will be described with reference to FIG. 8.

Figure 8:
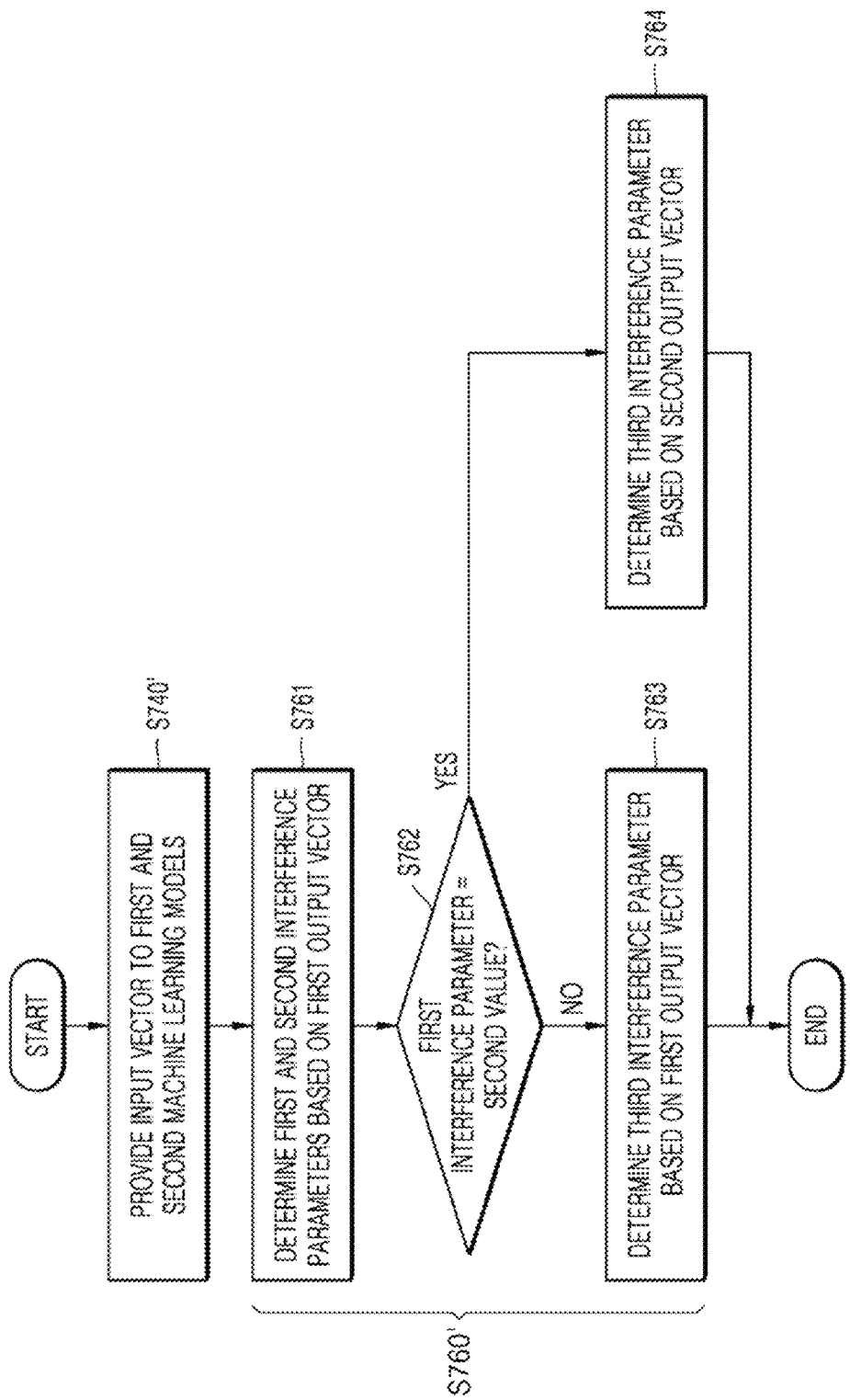
FIG. 8 is a flowchart illustrating an example of a method of estimating interference, according to an exemplary embodiment of the inventive concept.

FIG. 8 is a flowchart illustrating an example of a method of estimating interference, according to an exemplary embodiment of the inventive concept, showing an example of operation S740 and operation S760 of FIG. 4. As described above with reference to FIG. 4, in operation S740' of FIG. 8, an operation of providing the input vector IN to the at least one machine learning model may be performed and, in operation S760' of FIG. 8, an operation of determining the interference parameters based on the output vector OUT of the at least one machine learning model may be performed. As illustrated in FIG. 8, operation S760' may include a plurality of operations S761, S762, S763, and S764. In some embodiments, the method of FIG. 8 may be performed based on the first machine learning model 171 and the second machine learning model 172 of FIG. 6, respectively generating the first output vector OUT1 and the second output vector OUT2 of FIG. 7A and FIG. 8 will be described hereinafter with reference to FIGS. 6, 7A, and 7B.

Referring to FIG. 8, in operation S740', operation of providing the input vector IN to the first machine learning model 171 and the second machine learning model 172 may be performed. For example, the at least one first processor 150 of FIG. 2 may commonly provide the input vector IN to the first machine learning model 171 and the second machine learning model 172. In the present example, the first input vector IN1 and the second input vector IN2 of FIG. 6 may be identical. In some embodiments, unlike in FIG. 8, the at least one first processor 150 of FIG. 2 may provide the input vector IN to the first machine learning model 171 in operation S740'. Additionally or alternately, the at least one first processor 150 may provide the input vector IN to the second machine learning model 172 prior to operation S764 when the first interference parameter is determined to have a second value in operation S762, described later. As illustrated in FIG. 8, operation S760' may be performed after operation S740'.

In operation S761, an operation of determining the first interference parameter and the second interference parameter based on the first output vector OUT1 may be performed. For example, the at least one first processor 150 may receive the first output vector OUT1 with the first to 15th ratings R1 to R15 from the second processor 170 as illustrated in FIG. 7A and may detect one of the 15 combinations based on the highest rating (or the lowest rating) in the first to 15th ratings R1 to R15. Therefore, based on the table of FIG. 7A, the at least one first processor 150 may determine the interference rank r as the first interference parameter and may determine the interference TPR $\rho_I$ as the second interference parameter.

In operation S762, determining whether the first interference parameter has the second value may be performed. For example, the at least one first processor 150 may determine whether the interference rank $r_I$ determined as the first interference parameter has the second value, for example, 2 in operation S761. As illustrated in FIG. 8, when the interference rank r has not the second value but a first value, for example, when the interference rank $r_I$ is 1, operation S763 may be subsequently performed and, when the interference rank $r_I$ is 2, operation S764 may be subsequently performed.

When the first interference parameter has the first value, an operation of determining a third interference parameter based on the first output vector OUT1 may be performed in operation S763. For example, as described above with reference to FIG. 7A, the at least one first processor 150 may determine the interference precoding matrix $P_I$ as the third interference parameter from the first output vector OUT1 when the interference rank $r_I$ is 1.

Additionally or alternatively, in operation S764, an operation of determining the third interference parameter based on the second output vector OUT2 may be performed when the first interference parameter has the second value. For example, as described above with reference to FIG. 7B, the at least one first processor 150 may determine the interference precoding matrix $P_I$ as the third interference parameter from the second output vector OUT2 when the interference rank $r_I$ is 2.

Figure 9:
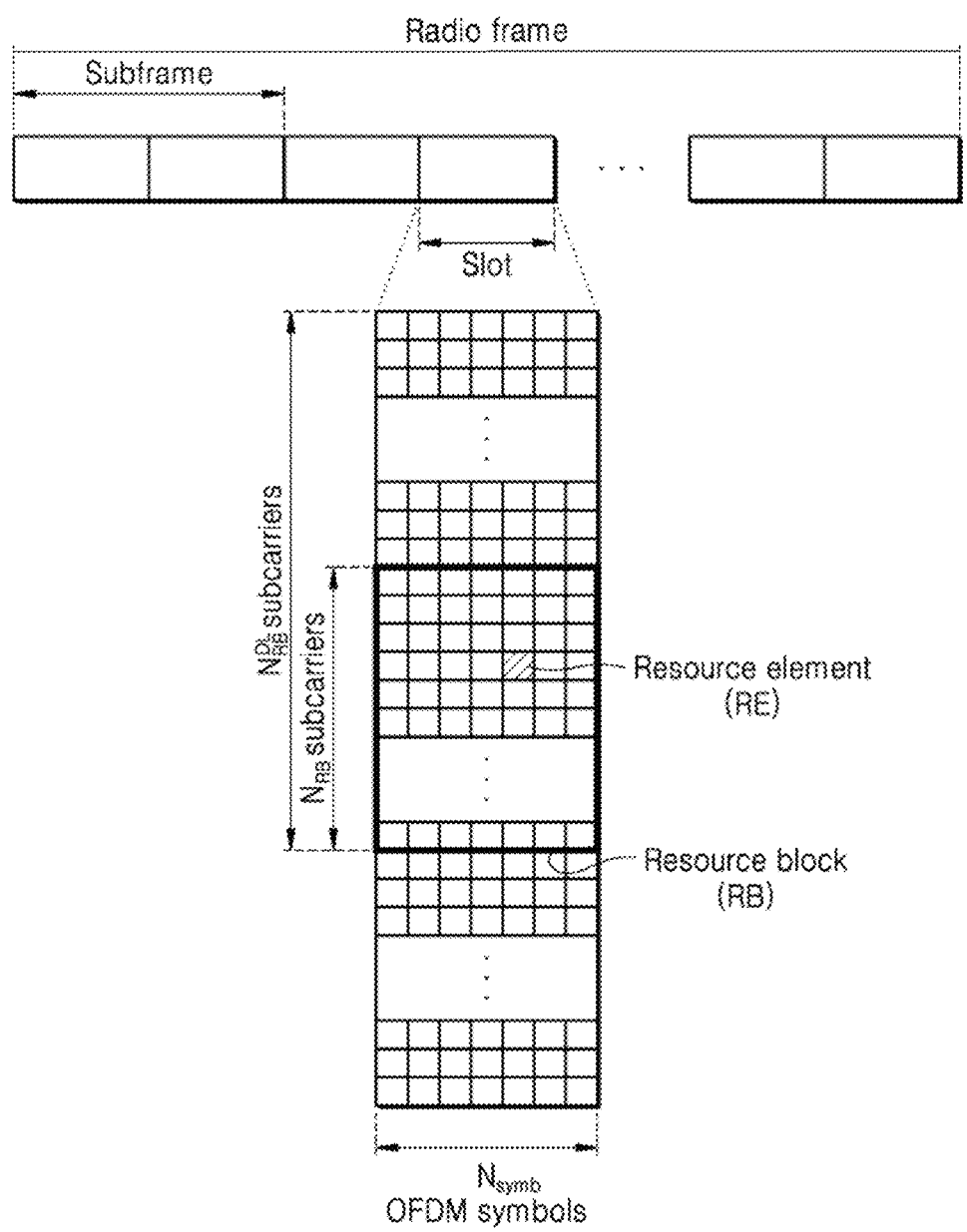
FIG. 9 is a view illustrating an example of a slot in a wireless communication system according to an exemplary embodiment of the inventive concept.

FIG. 9 is a view illustrating an example of a slot in a wireless communication system according to an exemplary embodiment of the inventive concept. In FIG. 9, the horizontal axis represents the time domain and the vertical axis represents the frequency domain. A minimum transmission unit in the time domain may be an OFDM symbol, $N_{symb}$ OFDM symbols may form one slot, and two slots may form one sub-frame. The slot may have a length of 0.5 ms, and the sub-frame may have a length of 1.0 ms. Hereinafter, FIG. 9 will be described with reference to FIG. 1.

A radio frame may correspond to a time-domain period formed of ten sub-frames. A minimum transmission unit in the frequency domain is a subcarrier and a bandwidth of an entire system transmission band may be formed of $N_{BW}$ subcarriers. In the time-frequency domain, a basic unit of resources as a resource element RE may be indexed by an OFDM symbol index and a subcarrier index. A resource block RB may be defined by $N_{symb}$ continuous OFDM symbols in the time domain and $N_{RB}$ continuous subcarriers in the frequency domain. Therefore, as illustrated in FIG. 9, the one resource block RB may include $N_{symb} \times N_{RB}$ resource elements RE. In an LTE (or LTE-A) system, in general, $N_{symb}$ may be 7, $N_{RB}$ may be 12, and $N_{BW}$ and $N_{RB}$ may be proportional to the bandwidth of the system transmission band. A data throughput (or a data rate) may increase in proportion to the number of resource blocks RB scheduled in the UE 30 of FIG. 1.

In the time domain and/or the frequency domain, resource elements RE close to each other may have common interference parameters. Hereinafter, as described later with reference to FIGS. 10 and 11, the interference parameters may be estimated based on a series of resource elements RE close to each other in the time domain and/or the frequency domain.

Figure 10:
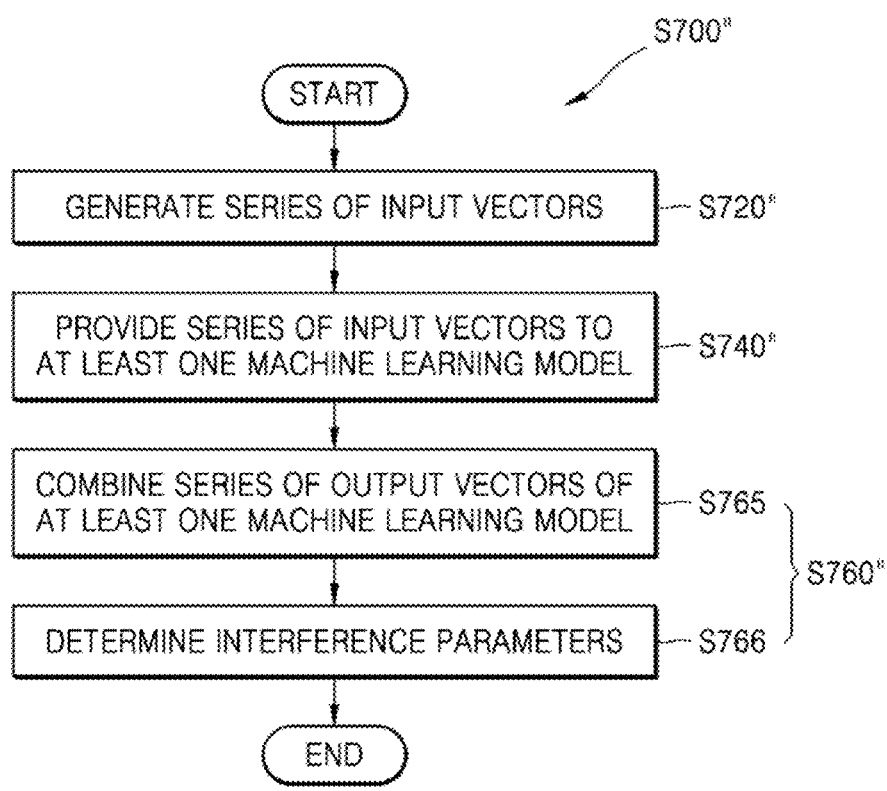
FIG. 10 is a flowchart illustrating an example of a method of estimating interference, according to an exemplary embodiment of the inventive concept.
Figure 11:
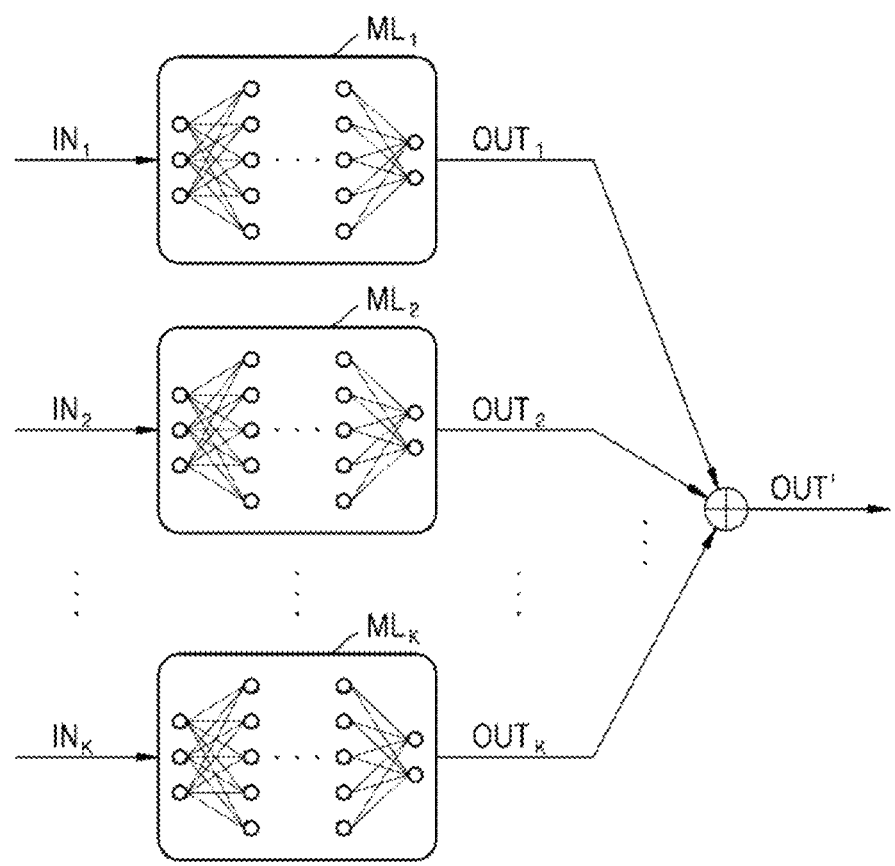
FIG. 11 is a view illustrating an example of an operation by the method of estimating the interference of FIG. 10 according to an exemplary embodiment of the inventive concept.

FIG. 10 is a flowchart illustrating an example of a method of estimating interference, according to an exemplary embodiment of the inventive concept. FIG. 11 is a view illustrating an example of an operation by the method of estimating the interference of FIG. 10 according to an exemplary embodiment of the inventive concept, showing an example of operation S700 of FIG. 3. As illustrated in FIG. 10, operation S700" of FIG. 10 may include a plurality of operations S720", S740", and S760". In some embodiments, operation S700" may be performed by the at least one first processor 150 of FIG. 2 and FIGS. 10 and 11 will be described with reference to FIGS. 2 and 9 hereinafter.

Referring to FIG. 10, in operation S720", an operation of generating a series of input vectors may be performed. In some embodiments, the at least one first processor 150 may generate a series of input vectors corresponding to a series of radio resources. For example, as illustrated in FIG. 11, the at least one first processor 150 may generate first to Kth input vectors $IN_1$ to $IN_K$ (K is an integer greater than 1) and may respectively correspond to K resource elements RE close to each other in the time domain and/or the frequency domain in FIG. 9. As described above with reference to FIG. 9, the interference parameters may be common in the K resource elements RE and accordingly, to determine the interference parameters, as illustrated in FIG. 11, first to Kth output vectors OUT1 to OUTK generated by the first to Kth input vectors $IN_1$ to $IN_K$ may be combined with each other.

In operation S740", an operation of providing a series of input vectors to at least one machine learning model may be performed. In some embodiments, the at least one first processor 150 may provide the first to Kth input vectors $IN_1$ to $IN_K$ generated in operation S720" to the second processor 170. For example, the at least one first processor 150 may sequentially provide the first to Kth input vectors $IN_1$ to $IN_K$ to the second processor 170 and may simultaneously provide at least two of the first to Kth input vectors $IN_1$ to $IN_K$ to the second processor 170. As described above with reference to FIG. 6, in some embodiments, the second processor 170 may execute two or more identical machine learning models in parallel. Accordingly, by processing two or more input vectors simultaneously provided by the at least one first processor 150 in parallel, two or more output vectors may be generated.

Referring to FIG. 11, the first to Kth input vectors $IN_1$ to $IN_K$ may be respectively provided to first to Kth machine learning models $ML_1$ to $ML_K$ and the first to Kth machine learning models $ML_1$ to $ML_K$ may respectively output first to Kth output vectors $OUT_1$ to $OUT_K$. The first to Kth machine learning models $ML_1$ to $ML_K$ may be identical. For example, the first to Kth machine learning models $ML_1$ to $ML_K$ may correspond to repeated performing of at least one machine learning model by the second processor 170 or the K machine learning models that may be executed by the second processor 170 in parallel.

Referring to FIG. 10 again, operation S760" may be performed subsequent to operation S740" and operation S760" may include operation S765 and operation S766. In operation S765, an operation of combining a series of output vectors of at least one machine learning model may be performed. In some embodiments, the at least one first processor 150 may receive the first to Kth output vectors $OUT_1$ to $OUT_K$ corresponding to the first to Kth input vectors $IN_1$ to $IN_K$ from the second processor 170 and, as illustrated in FIG. 11, may output one output vector OUT' by combining the first to Kth output vectors $OUT_1$ to $OUT_K$. For example, the at least one first processor 150 may generate the one output vector OUT' by adding the first to Kth output vectors $OUT_1$ to $OUT_K$ and may generate the one output vector OUT' as a weighted sum of the first to Kth output vectors $OUT_1$ to $OUT_K$ based on K weight values determined in accordance with positions of the K resource elements RE corresponding to the first to Kth output vectors $OUT_1$ to $OUT_K$. A method of the at least one first processor 150 combining the first to Kth output vectors $OUT_1$ to $OUT_K$ is not limited to the above-described examples.

In operation S766, an operation of determining the interference parameters may be performed. For example, the at least one first processor 150 may identify a combination of the values of the interference parameters based on ratings included in the one output vector OUT' and may determine the interference parameters in accordance with the identified combination.

Figure 12:
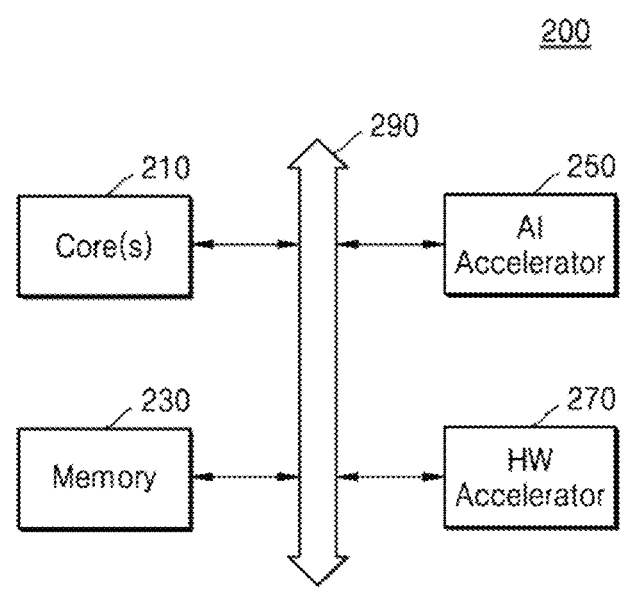
FIG. 12 is a block diagram illustrating an apparatus according to an exemplary embodiment of the inventive concept.

FIG. 12 is a block diagram illustrating an apparatus 200 according to an exemplary embodiment of the inventive concept. In some embodiments, a method of estimating interference according to an exemplary embodiment of the inventive concept may be performed by the apparatus 200 of FIG. 12.

As illustrated in FIG. 12, the apparatus 200 may include at least one core 210, a memory 230, an artificial intelligence (AI) accelerator 250, and a hardware accelerator 270 and the at least one core 210, the memory 230, the A accelerator 250, and the hardware accelerator 270 may communicate with each other through a bus 290. In some embodiments, the at least one core 210, the memory 230, the A accelerator 250, and the hardware accelerator 270 may be included in one semiconductor chip. Additionally or alternatively, in some embodiments, at least two of the at least one core 210, the memory 230, the A accelerator 250, and the hardware accelerator 270 may be respectively included in at least two semiconductor chips mounted on a board.

The at least one core 210 may execute instructions. For example, the at least one core 210 may execute an operating system by executing instructions stored in the memory 230 and may execute applications executed by the operating system. In some embodiments, the at least one core 210 may instruct the A accelerator 250 and/or the hardware accelerator 270 to perform work by executing the instructions and may obtain a result of performing the work from the AI accelerator 250 and/or the hardware accelerator 270. In some embodiments, the at least one core 210 may be an application-specific instruction-set processor (ASIP) and may support a dedicated instruction set.

The memory 230 may have an arbitrary structure in which data is stored. For example, the memory 230 may include a volatile memory device such as dynamic random access memory (DRAM) or static random access memory (SRAM) or a non-volatile memory device such as flash memory or resistive random access memory (RRAM). The at least one core 210, the AI accelerator 250, and the hardware accelerator 270 may store data in the memory 230 or read data from the memory 230 through the bus 290.

The AI accelerator 250 may refer to hardware designed for AI applications. In some embodiments, the AI accelerator 250 may include a neural processing unit (NPU) for implementing a neuromorphic structure, may generate output data by processing input data provided by the at least one core 210 and/or the hardware accelerator 270, and may provide the output data to the at least one core 210 and/or the hardware accelerator 270. In some embodiment, the AI accelerator 250 may be programmable and may be programmed by the at least one core 210 and/or the hardware accelerator 270.

The hardware accelerator 270 may refer to a hardware circuit designed for performing specific work at an increased speed. For example, the hardware accelerator 270 may be designed to perform data conversion such as demodulation, modulation, encoding, or decoding at an increased speed. The hardware accelerator 270 may be programmable and may be programmed by the at least one core 210 and/or the hardware accelerator 270.

The apparatus 200 may perform the method of estimating interference according to an exemplary embodiment of the inventive concept and may be referred to as an apparatus for estimating interference. For example, the at least one core 210 and/or the hardware accelerator 270 may perform operations performed by the at least one first processor 150 of FIG. 2 and the A accelerator 250 may perform operations of the second processor 170 of executing the at least one machine learning model 175. For example, the at least one core 210 and/or the hardware accelerator 270 may generate the input vector IN and may provide the generated input vector IN to the A accelerator 250. The A accelerator 250 may provide the output vector OUT corresponding to the input vector IN to the at least one core 210 and/or the hardware accelerator 270 by executing the at least one machine learning model trained by the plurality of sample input vectors and the plurality of sample interference parameters. The trained machine learning model executed by the AI accelerator 250 may be implemented during the manufacturing of the apparatus 200 and may be updated based on data provided from the outside of the apparatus 200 while the apparatus 200 is used.

While the inventive concept has been particularly shown and described with reference to embodiments thereof, it will be understood that various changes in form and details may be made therein without departing from the spirit and scope of the following claims.

What is claimed is:

1. A method comprising:
   generating an input vector from at least one of a received signal vector corresponding to a received signal including a serving signal and an interference signal, a serving channel matrix corresponding to the serving signal, and an interference channel matrix corresponding to the interference signal;
   providing the input vector to at least one machine learning model trained by a plurality of sample input vectors and a plurality of sample interference parameters; and
   determining interference parameters corresponding to the interference signal based on an output vector of the at least one machine learning model.

2. The method of claim 1, wherein the interference parameters comprise:
   a first interference parameter corresponding to a rank used for transmission of the interference signal;
   a second interference parameter corresponding to transmission power of the interference signal; and
   a third interference parameter corresponding to a precoding matrix used for the interference signal.

3. The method of claim 2, wherein the providing of the input vector to the at least one machine learning model comprises providing the input vector to a first machine learning model configured to generate a first output vector including ratings respectively corresponding to combinations of a first candidate value of the first interference parameter, a second candidate value of the second interference parameter, and a third candidate value of the third interference parameter, wherein the third candidate value is available for a first value of the first interference parameter.

4. The method of claim 3, wherein the determining of the interference parameters comprises determining the first interference parameter based on the first output vector, and
   wherein the providing of the input vector to the at least one machine learning model further comprises providing the input vector to a second machine learning model configured to generate a second output vector including ratings respectively corresponding to fourth candidate values of the third interference parameter when a value of the first interference parameter is a second value, wherein the fourth candidate values are available for the second value of the first interference parameter.

5. The method of claim 4, wherein the determining of the interference parameters comprises:
   determining the second interference parameter based on the first output vector;
   determining the third interference parameter based on the first output vector when a value of the first interference parameter is the first value; and
   determining the third interference parameter based on the second output vector when the value of the first interference parameter is the second value.

6. The method of claim 1, wherein the generating of the input vector comprises generating a series of input vectors from at least one of a series of received signal vectors corresponding to a series of reception units, the serving channel matrix, and the interference channel matrix,
   wherein the providing the input vector to the at least one machine learning model comprises providing the series of input vectors to the at least one machine learning model, and
   wherein the determining of the interference parameters comprises determining the interference parameters by combining a series of output vectors of the at least one machine learning model corresponding to the series of input vectors.

7. The method of claim 1, wherein the generating of the input vector comprises:
   calculating a plurality of real numbers from at least one of the received signal vector, the serving channel matrix, and the interference channel matrix; and
   generating the input vector including the plurality of real numbers.

8. The method of claim 1, further comprising:
   generating the serving channel matrix based on a reference signal provided by a base station providing the serving signal; and
   generating the interference channel matrix based on a reference signal provided by a second base station providing the interference signal.

9. An apparatus comprising:
at least one first processor configured to generate an input vector from at least one of a received signal vector corresponding to a received signal including a serving signal and an interference signal, a serving channel matrix corresponding to the serving signal, and an interference channel matrix corresponding to the interference signal; and
a second processor configured to execute at least one machine learning model trained by a plurality of sample input vectors and a plurality of sample interference parameters,
wherein the at least one first processor is configured to provide the input vector to the second processor and determine interference parameters corresponding to the interference signal based on an output vector of the at least one machine learning model provided by the second processor.

10. The apparatus of claim 9, wherein the at least one machine learning model is trained to generate the output vector including ratings respectively corresponding to available combinations of values of the interference parameters.

11. The apparatus of claim 9, wherein the interference parameters comprise:
a first interference parameter corresponding to a rank used for transmission of the interference signal;
a second interference parameter corresponding to transmission power of the interference signal; and
a third interference parameter corresponding to a precoding matrix of the interference signal.

12. The apparatus of claim 11, wherein the at least one machine learning model comprises:
a first machine learning model configured to generate a first output vector including ratings respectively corresponding to combinations of a first candidate value of the first interference parameter, a second candidate value of the second interference parameter, and a third candidate value of the third interference parameter from the input vector, wherein the third candidate value is available for a first value of the first interference parameter; and
a second machine learning model configured to generate a second output vector including ratings respectively corresponding to fourth candidate values of the third interference parameter from the input vector, wherein the fourth candidate values are available for a second value of the first interference parameter.

13. The apparatus of claim 12, wherein the at least one first processor is configured to determine a value of the first interference parameter based on the first output vector and to provide the input vector to the second machine learning model when the value of the first interference parameter is the second value.

14. The apparatus of claim 11, wherein the first interference parameter is a rank indicator (RI),
wherein the second interference parameter is a traffic to pilot ratio (TPR), and
wherein the third interference parameter is a precoding matrix index (PMI).

15. The apparatus of claim 9, wherein the at least one first processor is configured to generate a series of input vectors from a series of received signal vectors corresponding to a series of reception units, the serving channel matrix, and the interference channel matrix and to determine the interference parameters by combining a series of output vectors of the at least one machine learning model corresponding to the series of input vectors.

16. The apparatus of claim 9, wherein the at least one first processor is configured to calculate a plurality of real numbers from at least one of the received signal vector, the serving channel matrix, and the interference channel matrix and generate the input vector including the plurality of real numbers.

17. A method comprising:
generating a received signal vector from a received signal including a serving signal received through a first channel and an interference signal received through a second channel;
generating a serving channel matrix and an interference channel matrix by estimating the first channel and the second channel; and
estimating interference parameters corresponding to the received signal vector, the serving channel matrix, and the interference channel matrix based on at least one machine learning model trained by a plurality of sample received signal vectors, a plurality of sample serving channel matrixes, a plurality of sample interference channel matrixes, and a plurality of sample interference parameters.

18. The method of claim 17, wherein the estimating of the interference parameters comprises:
generating an input vector including a plurality of real numbers calculated from at least one of the received signal vector, the serving channel matrix, and the interference channel matrix;
obtaining an output vector by providing the input vector to the at least one machine learning model; and
determining the interference parameters based on the output vector.

19. The method of claim 18, wherein the at least one machine learning model is trained to generate the output vector including ratings respectively corresponding to available combinations of values of the interference parameters.

20. The method of claim 17, further comprising detecting a transmission signal transmitted through the first channel based on the received signal vector, the serving channel matrix, the interference channel matrix, and the interference parameters.

* * * * *